UNITED STATES PATENT OFFICE.

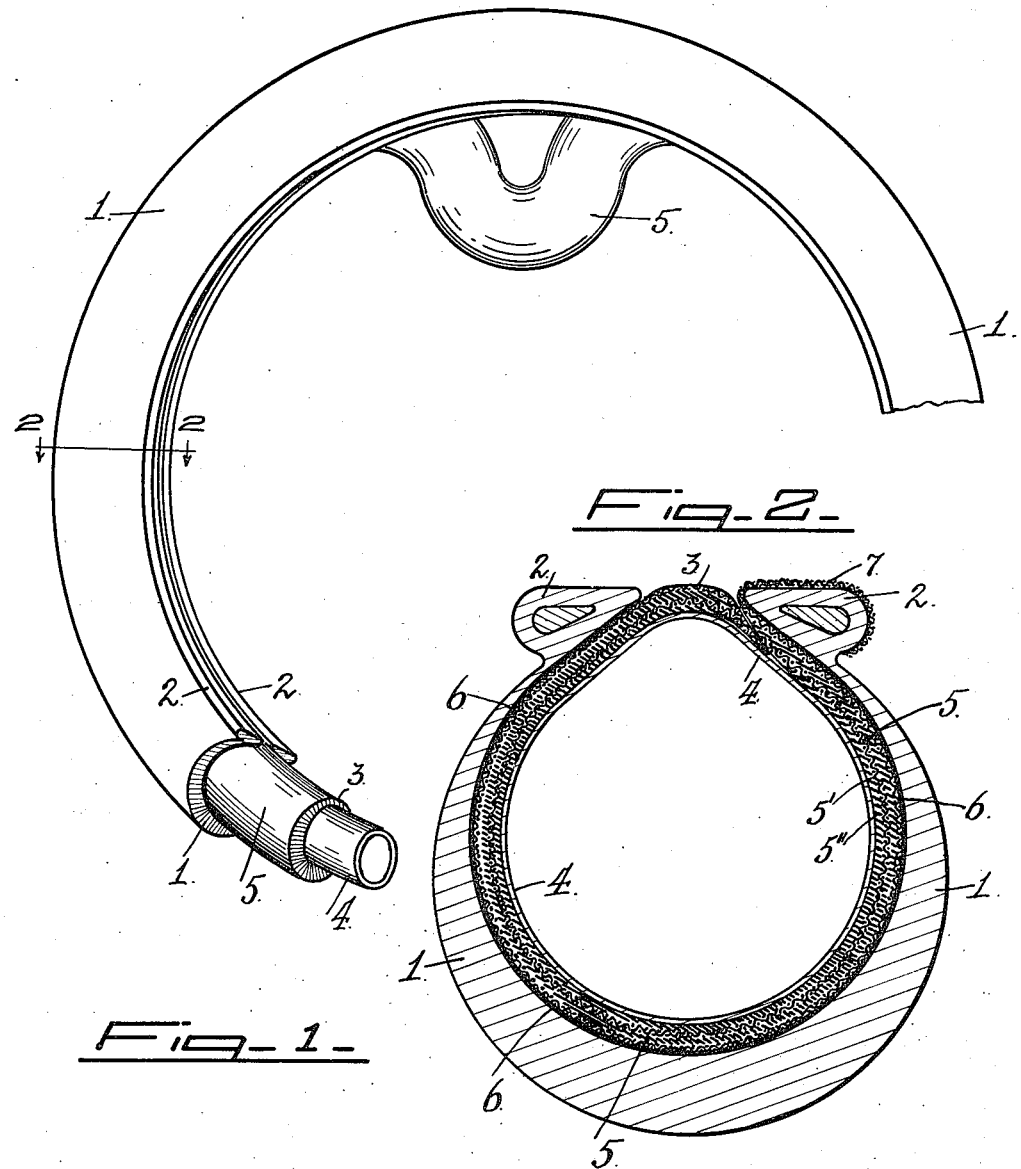

GEORGE A. LE DOUX, OF SAN FRANCISCO, CALIFORNIA.

AUTOMOBILE INSIDE TIRE.

1,300,980. Specification of Letters Patent. Patented Apr. 15, 1919.

Application filed August 13, 1918. Serial No. 249,605.

*To all whom it may concern:*

Be it known that I, GEORGE A. LE DOUX, a citizen of the United States, residing at the city and county of San Francisco and State of California, have invented certain new and useful Improvements in Automobile Inside Tires, of which the following is a specification.

My invention relates to the class of inside tires or shields which lie between the outer casing and the pneumatic tube of the tire-assemblage of automobile wheels. Heretofore these inside tires have commonly been made of worn outer casings stripped down to a few layers, or have been specially prepared as annular shoes or linings. But in their manufacture and use no attention is paid to the relative circumferences of the contacting surfaces of inside tire and casing other than that which is necessary to effect the entrance of the former into the latter and its fit therein with reasonable closeness. Accordingly the inside tire may be, purely incidentally, of exterior circumference less than the interior circumference of the casing, approximately the same circumference or larger. In the former cases cementing of the adjacent surfaces is practised to prevent relative movement with its well known deleterious effects; and in the last case, reliance is placed, to avoid creeping, upon the close but uncemented contact of the surfaces due to oversize of the inside tire, which latter condition, that is, oversize, is however, more or less purely accidental, and in any case, whether accidental or predetermined is slight, because it has heretofore quite naturally been considered that excessive oversize is inconsistent with a fit.

I have found in practice that none of these conditions, namely, undersize or approximate same size with cement, nor slight oversize without cement is sufficient to prevent creeping, and this has led me to the discovery that an oversize of the inside-tire with the addition of cement between the adjacent surfaces of said tire and the casing is not only a solution of the creeping problem, but that when the oversize is pronounced or relatively large it is also of great advantage in materially widening the range of utility of any given inside-tire in its application to casings both new and old. By this I mean that a given inside-tire of relatively large oversize may be applied to either a new casing which is unstretched, or to an old casing which is stretched; and with the addition of cement, may be fitted, with no tendency or chance to creep.

This, therefore, is the object of my present invention, and to this end my invention may be stated briefly and essentially to consist in a pneumatic tire assemblage comprising an outer casing, an inner tube, an inside elastic tire lying between the outer casing and the inner tube, and having a normal outside diameter greater than the inside diameter of the casing, and cementitious material uniting the adjacent surfaces of the outer casing and the inside tire.

My invention also consists in novel details of construction which I shall hereinafter fully describe, by reference to the accompanying drawings in which:

Figure 1 is a fragmentary perspective view, broken and partly in section of my tire assemblage.

Fig. 2 is a cross-section of my said tire assemblage, on the line 2—2 of Fig. 1.

1 is the outer casing having the beads 2. 3 is a flap for protecting the inner tube 4 at the wheel rim. 5 is the inside-tire of substantially uniform thickness lying between and throughout the entire circumference of the casing and tube. 6 indicates a layer of cement, herein exaggerated for the sake of clearness, said layer uniting the adjacent surfaces of the inside tire and the outer casing.

The inside tire 5 may be made of any suitable material and by any suitable method. Its only essential in this respect is that it shall have sufficient elasticity to enable it to be compressed to seat itself within the outer casing. I have accordingly illustrated it in Fig. 2 as composed of circumferentially superimposed layers of fabric 5' and intervening layers 5'' of rubber.

This inside tire has a normal or uncompressed outside diameter and outside circumference greater than the inside diameter and inside circumference of the casing, as is illustrated by its exposed slack portion in Fig. 1. The elastic nature of the inside tire enables it, notwithstanding its oversize, to be compressed to its seat smoothly, in the outer casing. When so seated, the cementitious material 6 having previously been applied unites the adjacent surfaces, and the double security against creeping afforded by the tight fit of the inside tire due to its oversize, and the cement is complete, In practice, I make the oversize of the inside-tire quite pronounced or relatively large. By this I gain not only the maximum tightness of fit under normal conditions as with new casings but also provide for its application to old tires, because the excessive oversize gives a sufficiently wide range to adapt the inside-tire to the possibly stretched condition of the old tires, with the combined effects of oversize and cementitious adhesion still present. As a further insurance against creeping, I secure or form with one edge of the inside tire 5, a holding flap 7 which extends outwardly over the bead 2 of the casing, and is clamped between said bead and the wheel rim.

The flap 3 may be the usual protection flap, but I prefer to secure it to or form it with one edge of the inside tire as shown. This flap is sufficiently thick to prevent it from wrinkling or buckling so as not to pinch the inner tube. It tapers to a thin edge and the air valve hole in it should be larger than usual so that the inner tire to which it is secured can expand and contact without pressure on the air valve stem.

I claim:

In combination with the outer casing and the inner tube of a pneumatic tire; an elastic inside tire lying between and throughout the entire circumference of the casing and the tube, said inside-tire having when uncompressed an outside diameter greater than the inside diameter of the casing; and cementitious material uniting the adjacent surfaces of the inside-tire and the outer casing.

In testimony whereof I have signed my name to this specification in the presence of two subscribing witnesses.

GEORGE A. LE DOUX.

Witnesses:
 WM. F. BOOTH,
 D. B. RICHARDS.